United States Patent
Doany et al.

(10) Patent No.: US 6,310,713 B2
(45) Date of Patent: *Oct. 30, 2001

(54) OPTICAL SYSTEM FOR MINIATURE PERSONAL DISPLAYS USING REFLECTIVE LIGHT VALVES

(75) Inventors: Fuad Elias Doany, Katonah, NY (US); Rama Nand Singh, Bethel, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,570

(22) Filed: Apr. 7, 1997

(51) Int. Cl.[7] ............................. G02B 5/30; G02B 27/28; G02F 1/03

(52) U.S. Cl. ..................... 359/247; 359/256; 359/263; 359/487; 359/494; 359/495; 359/631; 349/11

(58) Field of Search ................................. 359/247, 252, 359/253, 256, 267, 494, 495, 497, 629, 631, 630, 263, 487; 349/9, 11, 98

(56) References Cited

U.S. PATENT DOCUMENTS

| | | | |
|---|---|---|---|
| 3,658,405 | * | 4/1972 | Pluta . |
| 5,223,956 | * | 6/1993 | Kramer et al. ..................... 359/495 |
| 5,327,270 | * | 7/1994 | Miyatake ........................... 359/256 |
| 5,383,053 | * | 1/1995 | Hegg et al. ........................ 359/495 |
| 5,526,184 | * | 6/1996 | Tokuhashi et al. ................ 359/631 |
| 5,535,054 |   | 7/1996 | Shibuya . |
| 5,572,343 | * | 11/1996 | Okamura et al. .................. 359/631 |
| 5,596,451 |   | 1/1997 | Handschy et al. . |
| 5,610,765 | * | 3/1997 | Colucci .............................. 359/497 |
| 5,617,227 | * | 4/1997 | Tocnaye et al. . |
| 5,808,800 | * | 9/1998 | Handschy et al. ................. 349/11 |

FOREIGN PATENT DOCUMENTS

| | | |
|---|---|---|
| 0 602 923 A1 | 6/1994 | (EP) . |
| WP 96/12207 | 4/1996 | (WO) . |

* cited by examiner

*Primary Examiner*—Ricky D. Shafer
(74) *Attorney, Agent, or Firm*—Scully, Scott, Murphy & Presser; Marian Underweiser, Es

(57) ABSTRACT

An illumination system and display are disclosed that include a light for providing light, a polarizing beam splitter (PBS) having a first surface that receives the light from the backlight. The PBS passes a first polarization of the received light to a curved mirror located at a second PBS face, which second PBS face is opposite the first PBS face. The curvature of the mirror provides the optical power necessary for proper imaging, while limiting the reflecting area of the mirror provides an aperture stop that determines the numerical aperture of the optical system. The display also includes a quarter wave plate and a spatial light modulator (SLM). The quarter wave plate is located between the PBS and mirror and changes the first polarization of light, directed from the PBS to the mirror, to a second polarization which is reflected from the mirror back to the PBS. The SLM receives this second polarization of light after reflection thereof by the PBS, and selectively rotates the second polarization of light to form an image forming light having the first polarization, which is reflected back to the PBS. Through an exit face, the PBS provides the rotated image forming light to a viewer. Between the viewer and the PBS exit surface, an imaging lens system is provided that includes at least one folding mirror.

1 Claim, 6 Drawing Sheets

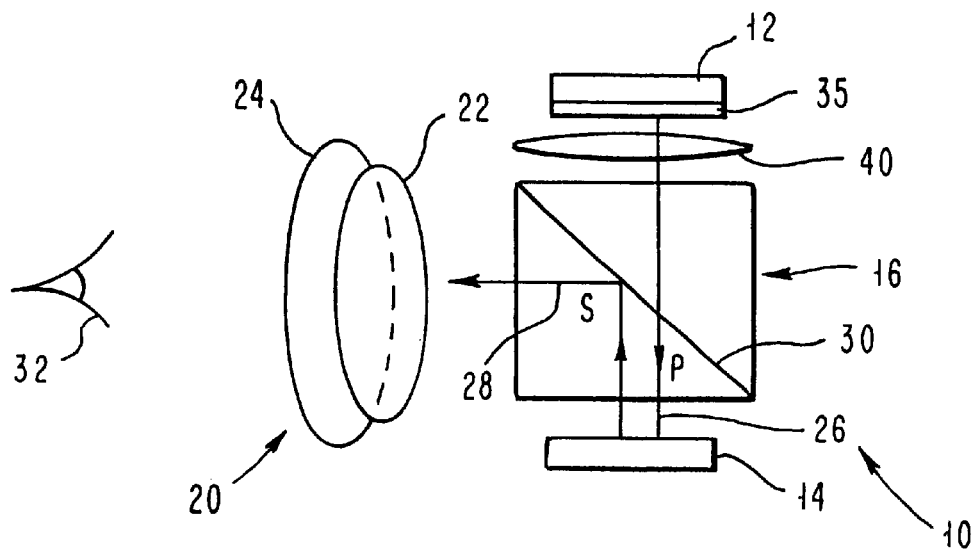
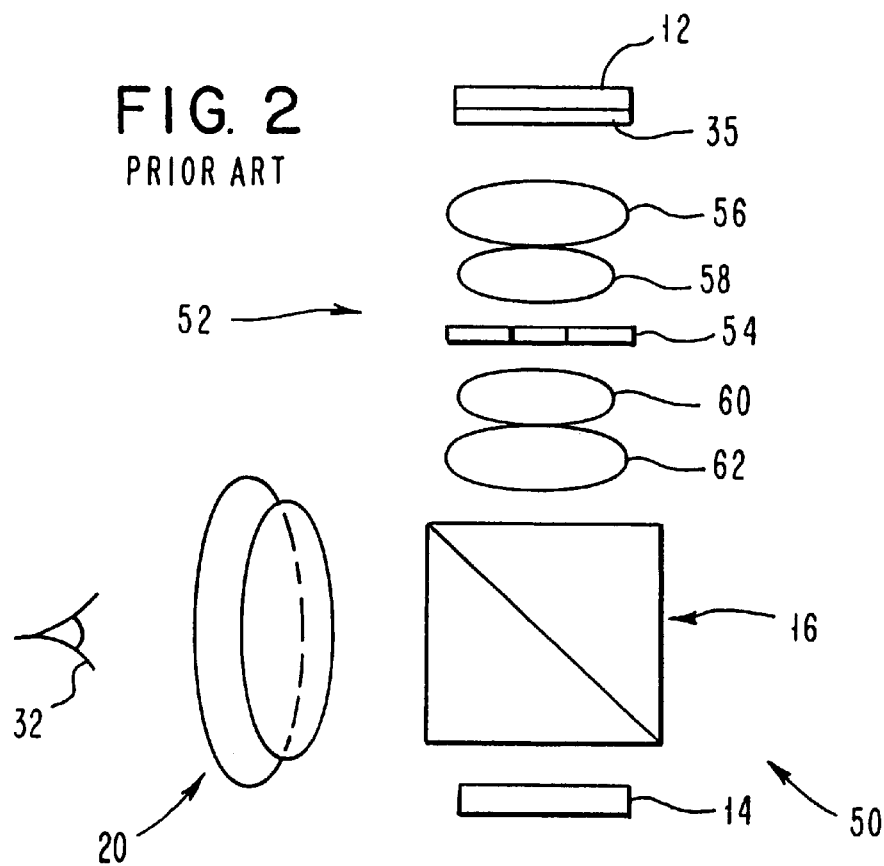

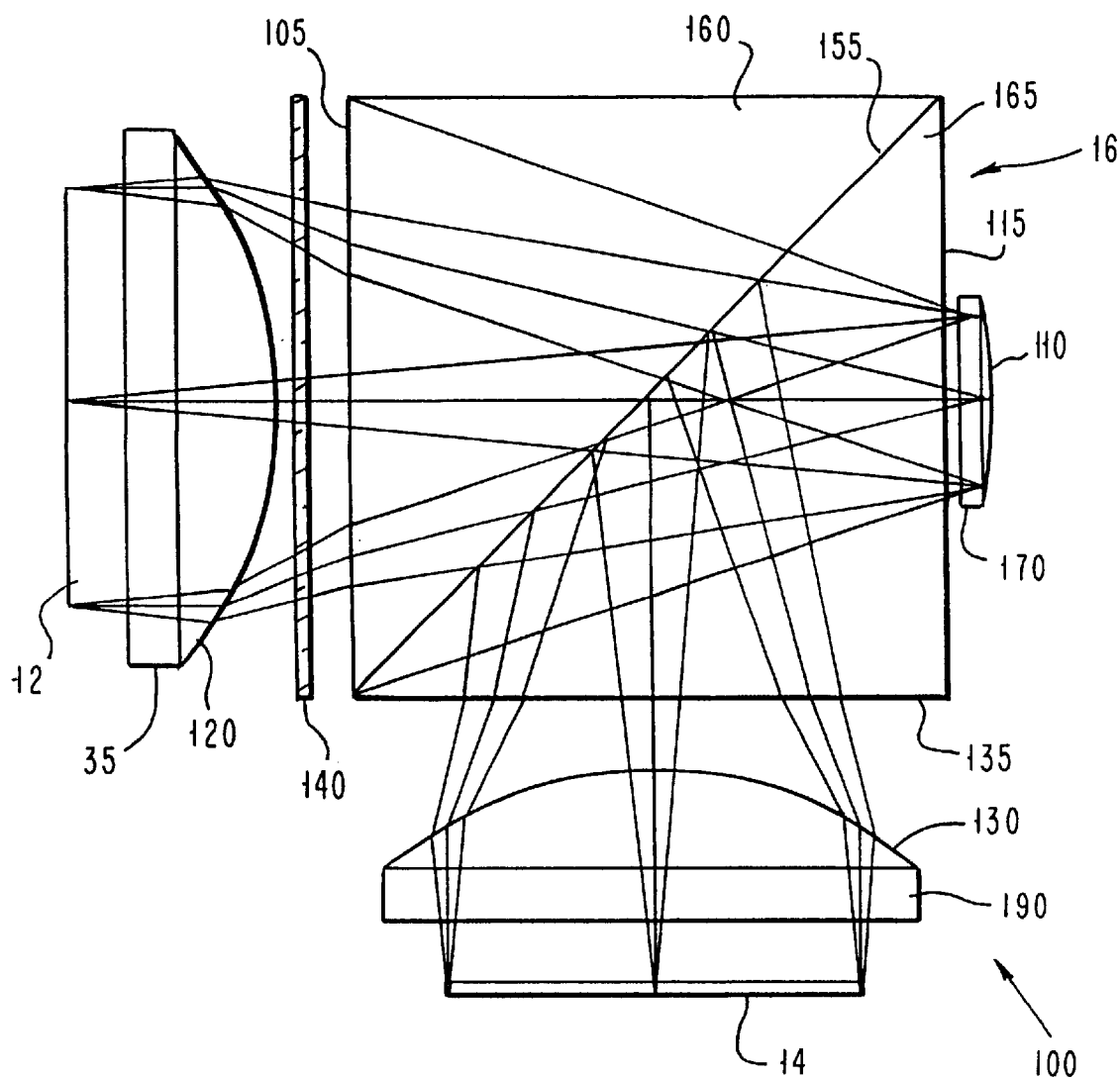

OPTICAL SYSTEM FOR MINIATURE PERSONAL DISPLAYS USING REFLECTIVE LIGHT VALVES

BACKGROUND OF THE INVENTION

1. Field of the Invention

The present invention is directed to an optical system for illuminating and imaging a reflective light valve, and more particularly, to systems using compact lightweight, and foldable optics for personal miniature displays using reflective light valves.

2. Discussion of the Prior Art

Typically, conventional miniature displays, such as head mounted displays (HMDs), are based on miniature cathode ray tube (CRT) or transmission-based liquid crystal light valve technology. The CRT-based systems are bulky, expensive, and heavy, and primarily used for military helmet-mounted applications. This technology is not suitable for lightweight, compact personal displays.

Transmission-based liquid crystal (LC) technology is the preferred technology for these portable miniature displays today. Although appropriate for the low resolution displays currently available, such as sub-VGA to VGA (640×480 pixels), this transmission-based LC technology is not adequate for high resolution miniature portable displays. VGA refers to video graphics adapter.

A transmission technology based display requires a clear aperture for transmission of light through the display. A transparent substrate is also required which incorporates all the display driving circuitry (such as active matrix circuitry). Typically, the driving circuitry uses amorphous silicon on glass technology or poly-silicon on quartz technology. The requirements of transparent substrate, clear aperture, and display control circuitry limit the minimum size of the display panel, thus preventing further display size reductions. To achieve smaller size display panels, reflective liquid crystal (LC) light valves are used.

Reflective liquid crystal light valves do not have the size limitation of transmission-based LC light valves. For reflective LC light valves, using crystalline silicon CMOS technology, the active matrix driving circuitry can be fabricated on 10 micron pixel dimensions or smaller. Furthermore, by using reflection liquid crystal devices, the requirement for a clear aperture in the display panel, needed for transmissive LC devices, is dispensed with. Instead, the reflective device incorporates a mirror array that is fabricated over the underlying CMOS circuitry. In this case, the entire surface of the device is available for display aperture. Thus, the pixel size is only limited by the CMOS technology required to fabricate the drive circuitry, which today is less than 10 microns per pixel. The functioning reflective display panel is completed when the liquid crystal and top glass are assembled over the mirror array.

Thus, miniature high resolution (>VGA) displays can be fabricated using silicon-based reflection liquid crystal devices. However, reflection-based light valves, such as liquid crystal (LC) spatial light modulators (SLMs) have complex illumination requirements. In reflection mode, the SLM must be illuminated and imaged from the same side. A simple backlight structure typically used in transmission-based displays is not directly applicable for reflective SLMs.

In order to illuminate the reflective SLM with polarized light, and image the SLM using a perpendicular polarization, typical optical systems incorporate a polarizing beam splitter cube (PBS) over the SLM.

FIG. 1 shows a conventional optical system 10. A light source 12 illuminates a reflective SLM 14 through a PBS 16. Image forming light, which is reflected from the SLM 14, passes through the PBS 16 and is viewed through an optical imaging system 20. The optical imaging system 20 has several lens elements, such as lens elements 22, 24.

The PBS 16 receives polarized light from the light source 12, passes one polarization, e.g., p-polarization, and reflects the other polarization, e.g. s-polarization. The p-polarized light beam 26 passing through the PBS 16 is incident onto the SLM 14 at largely normal incidence to the SLM 14.

The liquid crystal SLM 14 functions by selectively rotating the p-polarized light beam 26 to s-polarized light beam 28 at the individual pixel level to form an image in the SLM 14. The p-polarization of light (not shown) reflected from the SLM 14 passes through the PBS 16 and is discarded. The s-polarized light beam 28 reflected from the SLM 14, which is the image forming light resulting from selective polarization rotation by the SLM 14, is reflected by the inner surface 30 of the PBS 16 and directed toward the optical imaging system 20. Next, the image forming light 28 is imaged by the optical imaging system 20 to provide the proper imaging of the SLM 14 to a viewer 32. The illumination is thus incident onto the SLM 14 through the PBS 16.

A typical light source for miniature liquid crystal displays (LCDs) uses cold cathode fluorescent light sources (CCFL). One example is a linear CCFL tube coupled to a flat backlight structure. This example is a miniature version of the backlight that is typically used for conventional LCD laptop computer displays. Another example is using a CCFL source that is itself flat and rectangular. Both examples produce a compact flat surface emitting light source. The light source 12 depicted in FIG. 1 is a typical CCFL-based backlight (either flat CCFL or backlight panel incorporating a linear CCFL tube).

The angular distribution of light emitted from backlights is typically larger than the acceptance angle of the LCD. The addition of light brightness enhancing polymer films improves the directionality of the light, but cannot produce a collimated light source. In FIG. 1, a collimating film 35 and an optional lens 40 are shown located between the backlight 12 and PBS 16, respectively. The collimating film 35 and optional lens 40 collimate light from the backlight 12, and direct the collimated light to the SLM 14 through the PBS 16. The collimating film 35 is disposed on the backlight surface that faces the lens 40. The lens 40 is used for focusing and directing the light from the collimating film 35 to the PBS 16.

Although the conventional optical system 10 provides useful illumination to the SLM 14, the optical system 10 is not optimal and suffers from a number of disadvantages. First, light coupling to the SLM 14 is inefficient. Second, there is no control for the numerical aperture (NA) of the illumination.

Even when used with the collimating film 35 and the focusing lens 40, the angular distribution of the light entering the PBS 16 from the backlight 12 is larger than the acceptance angles of the PBS 16 and SLM 14. The polarization of the light beyond the acceptance angles is not adequately controlled by the collimating film 35 and/or focusing lens 40. This produces poor contrast in the resulting image. Furthermore, light at the extreme angles will scatter off the numerous optical surfaces producing additional depolarized background stray light and ghost images that will further degrade the image contrast.

In order to provide an efficient well-controlled illumination to the SLM, relay optics and an illumination aperture stop are included. FIG. 2 shows such a conventional illumination system 50. The illumination system 50 includes multi-element relay optics 52 to couple light from the light source 12 to the SLM 14. In addition, the illumination system 50 includes an illumination aperture stop 54 in order to control or limit the numerical aperture or angular distribution of light.

As in the conventional illumination system 10 of FIG. 1, in the conventional illumination system 50 of FIG. 2, the illumination is incident onto the reflective SLM 14 through the PBS 16. The light source 12 is imaged onto the SLM 14 by the multi-element relay lens 52, which has several optical elements, such as lenses 56, 58, 60, 62. The aperture stop 54 is within the multi-element relay lens 52, and is used to limit the numerical aperture of the illuminating light. The light source 12 itself incorporates the collimating film in order to enhance throughput. FIG. 2 shows the collimating film 35 located on a surface of the backlight 12 that faces the multi-element relay lens 52.

Although the conventional illumination optical system 50 is adequate for illuminating the reflective SLM 14, the optical system 50 is large and bulky. In addition, the optical system 50 is not suitable for portable personal displays, particularly compact, lightweight, head mounted displays.

SUMMARY OF THE INVENTION

The object of the present invention is to provide an optical system that eliminates the problems of conventional optical systems.

Another object of the present invention is to provide an optical system which is compact, efficient, has reduced background stray light and ghost images, and has enhanced contrast and brightness.

Yet another object of the present invention is to provide an optical system that has high optical performance and accommodates folding mirrors suitable for compact portable displays and head mounted displays (HMDs).

A further object of the present invention is to provide an optical system that provides the imaging and light controlling optics, including providing a desired numerical aperture, in a compact and folded optical package.

These and other objects of the present invention are achieved by an illumination system and display comprising a light source for providing light, and a polarizing beam splitter (PBS) for splitting the light into first and second polarizations. The PBS passes the first polarization and reflects the second polarization of light.

A reflective device is provided for reflecting light received from the PBS back to it. The reflective device is an aperture stop that determines the numerical aperture of the illumination system/display, and reflects light within the numerical aperture back to the PBS. Light outside the numerical aperture falls on a light absorbing substrate. Illustratively, the reflector is a mirror and is curved to provide a predetermined optical power.

The illumination system and display further comprises a quarter wave plate and a spatial light modulator (SLM). The quarter wave plate, which is located between the PBS and reflector, changes the first polarization of light, directed from the PBS to the reflector, to the second polarization, which is received by the PBS from the reflector.

The SLM receives this second polarization of light after reflection thereof by the PBS, and selectively rotates the second polarization of light to form an image forming light having the first polarization. The image forming light is reflected back to the PBS. Through an exit face, the PBS provides the image forming light to a viewer. Between the viewer and the PBS exit surface, an imaging lens system that includes at least one folding mirror is provided.

The illumination system and display also includes a first lens, located between the light source and PBS, for directing light from the light source to the PBS. A collimating film, located between the light source and the polarizing beam splitter, collimates light from the light source. A first polarizing film is also located between the light source and PBS, and provides polarization control of the light from the light source.

A second lens, located between the PBS and SLM, provides light to the SLM in a substantially normal direction thereto. In addition, a second polarizing film is disposed on an exit surface of the PBS, where the exit surface is opposite a PBS surface that faces the SLM.

BRIEF DESCRIPTION OF THE DRAWINGS

Further features and advantages of the invention will become more readily apparent from a consideration of the following detailed description, set forth with reference to the accompanying drawings, which specify and show preferred embodiments of the invention, wherein like elements are designated by identical references throughout the drawings; and in which:

FIG. 1 shows a conventional optical system using reflective light valves;

FIG. 2 shows another conventional optical system that includes relay optics and an illumination aperture stop;

FIG. 3 shows an optical system using reflective light valves according to one embodiment of the present invention;

DETAILED DESCRIPTION OF THE INVENTION

Figure 4:
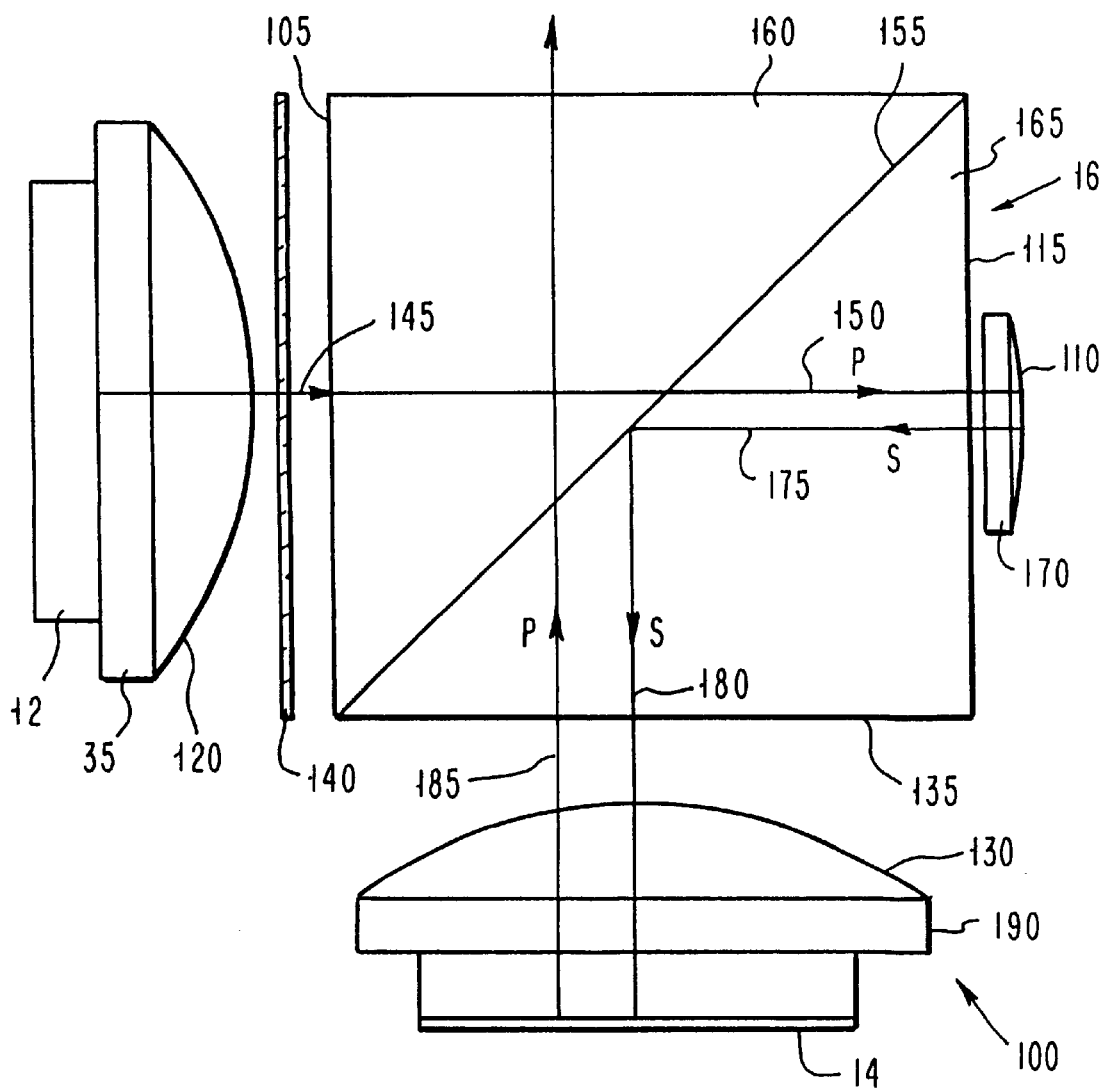
FIG. 4 shows light beam paths of the optical system shown in FIG. 3 according to the present invention.

FIG. 3 shows one embodiment of an illumination system 100 suitable for compact portable displays having a reflective SLM 14. The illumination optics of the system 100 are compact but provide the full function as the conventional system 50 shown in FIG. 2. That is, the optics of the system 100 relay light from a light source, such as the backlight source 12, onto the SLM 14. In addition, the optics of the system 100 provide an aperture stop to limit the numerical aperture of the system 100. The compact nature of the illumination system 100 is derived from folding the optical path almost entirely within the PBS 16. The individual optical elements are placed on three surfaces of the PBS 16.

The illumination optical relay system 100 comprises a light source, such as the backlight 12 for providing light, and a PBS 16 having a first surface 105, which is an input surface that receives light from the backlight 12. The first PBS surface 105 is referred to as an input surface. Illustratively, the light source 12 is a cold cathode fluorescent light sources (CCFL), such as: a linear CCFL tube coupled to a flat backlight structure, or a CCFL source that is itself flat and rectangular.

The PBS 16 provides one polarization of the received light to a reflective device 110. Illustratively, the reflector 110 is a mirror and is curved. The reflector 110 is located at a second PBS face 115, which second PBS surface 115 is opposite the first PBS surface or input surface 105. Illustratively, to minimize the size of the optical system 100, the curved mirror 110 is directly attached to the second surface 115 of the PBS 16.

The optical system 100 further comprises first and second lens elements 120, 130. The first lens element 120 is located between the backlight 12 and the PBS input surface 105. The second lens element 130 is located between a third PBS face 135 and the SLM 14.

The reflector or mirror 110 provides a dual function: (1) it provides the optical power required for proper imaging; and (2) it is the aperture stop that determines the numerical aperture of the optical system 100.

The optical power is provided by the curvature of the mirror 110. The aperture stop is controlled by providing a desired reflecting area of the mirror 110. Limiting the reflecting area of the mirror 110 limits the numerical aperture of the optical system 100. This provides a reflective aperture stop within the complete optical system 100.

Thus, the optical system 100 of FIG. 3 is functionally equivalent to the conventional illumination system 50 of FIG. 2. However, unlike the conventional system 50, the optical system 100 is very compact. The majority of the optical path is contained within the PBS 16. The PBS 16 is used in double-pass to provide an optical path equivalent to the length of two PBSs.

Light beams emitted by the backlight 12 are collected by the lens 120 and directed to the PBS 16. The backlight 12 itself may incorporate a collimating film 35 to enhance throughput. To further reduce the size of the illumination system 100, the light source 12, collimating film 35, and lens 120 are respectively attached to each other. In addition, a polarizing film 140 may be placed at the PBS input surface 105, between the PBS 16 and the backlight 12, to improve polarization control.

FIG. 4 shows the light path from the light source 12 to a viewer 32. Light beam 145 from the light source 12 enters the first or entry face 105 of the PBS 16. The PBS 16 passes one polarization of light, e.g., the p-polarization shown as numeral 150, and reflects the other polarization, e.g., the s-polarization (not shown), as is well known for a PBS.

Splitting light into two polarizations by the PBS 16 is due to a polarization separating surface 155 internal to the PBS 16. Illustratively, the polarization separating surface 155 is formed by two solid glass prisms 160, 165 that form the PBS 16.

The p-polarized light beam 150 then passes through the PBS 16 and impinges onto the reflective aperture stop or mirror 110 located at the PBS surface 115, which is opposite to the PBS input surface 105 that receives light 145 from the backlight 12.

As shown in FIGS. 3 and 4, the optical system 100 also comprises a quarter-wave film or plate 170. Prior to reaching the reflecting surface 110, the p-polarized light beam 150 first passes through the quarter-wave plate 170. The quarter-wave plate 170 produces a rotation of polarization of 45 degrees each time a light passes therethrough. In double-pass, where the light passes through the quarter-wave film 170, a 90 degrees rotation results.

As shown in FIG. 4, the p-polarized light beam 150 passing through the quarter-wave plate 170 toward the mirror 110, passes through the quarter-wave plate 170 a second time upon being reflected from the mirror or aperture stop 110. The light passing twice through the quarter-wave film 170 rotates by 90 degrees. This converts the p-polarized light beam 150 from the PBS 16 to the mirror 110 to an s-polarized light beam 175 from the mirror 110 to the PBS 16.

The reflecting area of the mirror 110 is limited to provide a desired aperture stop for the optical system 100. Thus, only light within a specified numerical aperture is reflected back into the PBS 16. Light falling outside the specified numerical aperture is rejected, since this light will "spill over" outside the reflective stop 110 and will be directed to a black absorbing substrate (not shown).

The s-polarized light beam 175, which is reflected from the mirror 110, is then reflected by the PBS 16, at the interface 155 of the two prisms 160, 165 that form the PBS 16. This PBS reflected s-polarized light is directed to the SLM 14 and is shown as numeral 180 in FIG. 4.

The second lens element 130 is placed at the SLM 14 to collect the s-polarized light beam 180 from the PBS 16 and direct it to the SLM 14 in a predominantly telecentric or normal direction. The SLM 14 selectively rotates the s-polarization 180 of the illuminating light to form a p-polarized image-forming light 185. Only the p-polarized image-forming light beam 185 is passed by the PBS 16 and directed to the viewer 32. Any s-polarized light (not shown) reflected from the SLM 14 is reflected away from the viewer 32 by the PBS 16.

Optionally, another collimating film 190 is located between the SLM 14 and lens 130. The SLM 14, collimating film 190, and lens 130 are respectively attached to each other to further reduce the size of the illumination system 100.

Figure 5:
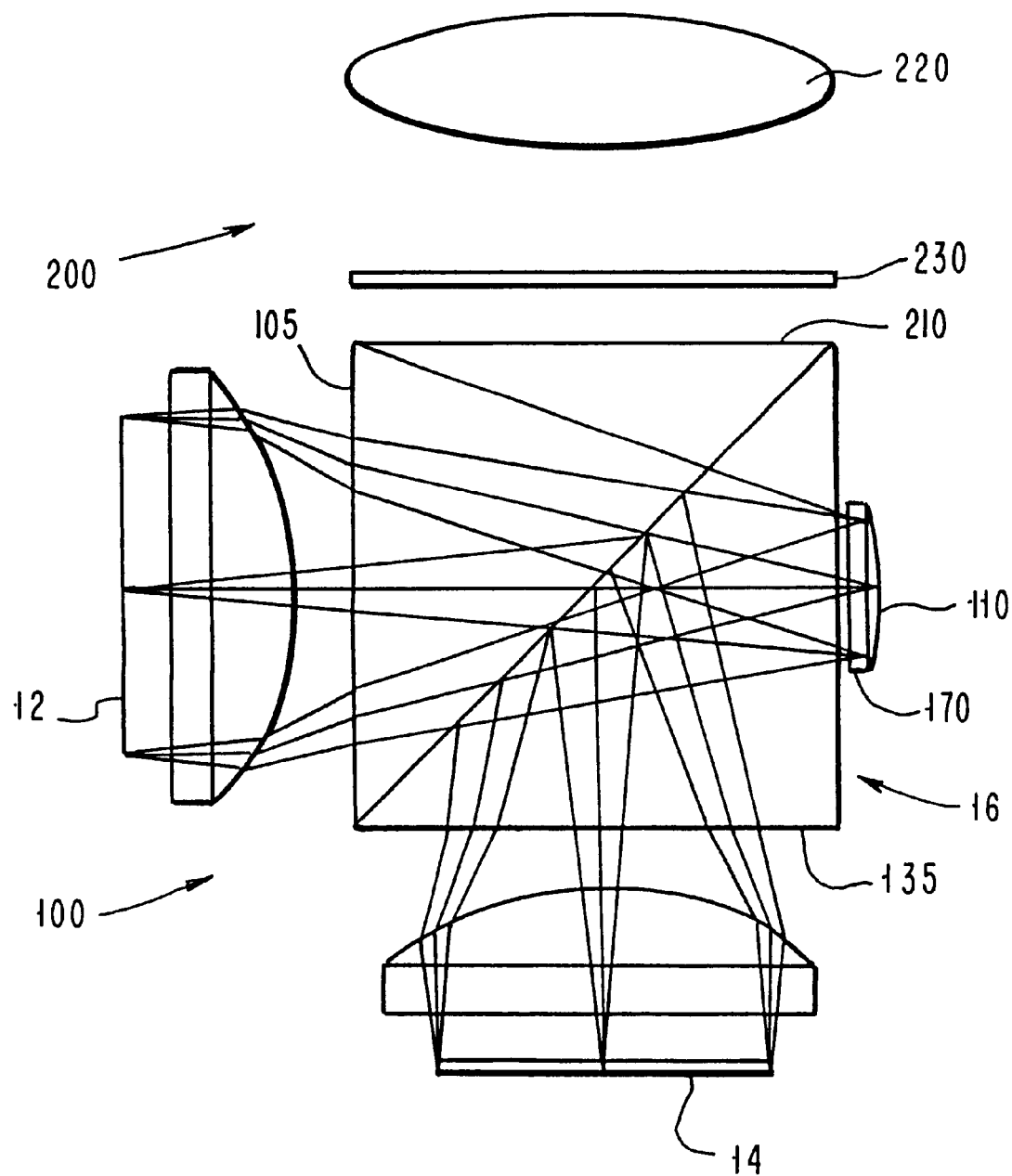
FIG. 5 shows an optical system using reflective light valves together with a viewing system according to the present invention.

FIG. 5 shows an embodiment of the illumination optical system 100 together with an imaging optics 200 placed between the PBS 16 and the viewer 32. FIG. 5 shows schematically how the compact illumination optical system 100 is used with the imaging optical system 200. In this embodiment, the imaging system 200 comprises a lens 220. The image forming p-polarized light 185 (FIG. 4), that exits the PBS 16 from an exit surface 210 thereof, is collected by the lens 220 and is imaged to the viewer 32. The PBS exit surface 210 is opposite the PBS surface 135 nearest the SLM 14.

The imaging system 200 also comprises an optional polarizing film or plate 230 located between the exit surface 210 of the PBS 16 and the imaging lens 220. The polarizing plate 230 absorbs s-polarized light and passes p-polarized light. This polarizing film 230 absorbs any s-polarized background light and improves the contrast of the image. The optional polarizing plates 140, 230, shown in FIGS. 4 and 5, respectively, where one polarizing plate 140 is located at the input (between backlight 12 and PBS 16), and the other polarizing plate 230 is located at the exit (between PBS 16 and imaging lens 220) surfaces 105, 210 of the PBS, improve image contrast by providing better polarization purity in the illumination and imaging optics.

Figure 6:
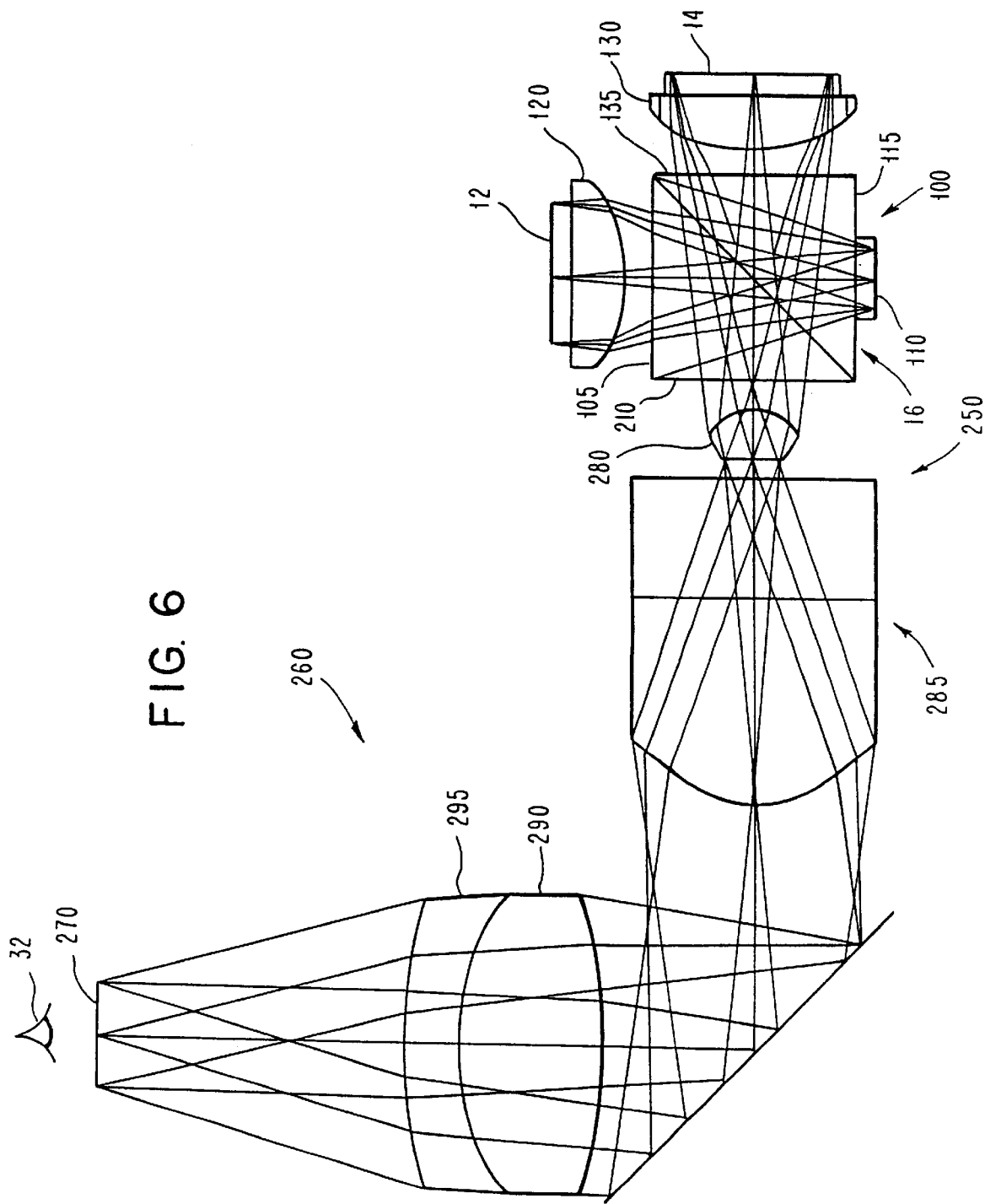
FIG. 6 shows an optical system using reflective light valves together with a viewing system according to another embodiment of the present invention.

FIG. 6 shows another embodiment of a complete optical system 250 which uses the illumination optical system 100 described in connection with FIG. 3. An imaging system 260 is located between the viewer 32 and the illumination optical system 100. The imaging system 260 works in conjunction with the illumination optics 100 to image the SLM 14 to the viewer 32. As shown in FIG. 6, the imaging system 260 comprises four elements 280, 285, 290, 295 in two groups. The first and second elements 280, 285 form the first group, while the third and fourth elements 290, 295 form the second group. The elements of the imaging system 260 provide desired relaying, directing, focussing and magnifying of the image from the PBS exit surface 210 to the viewer 32.

The complete optical system 250 of FIG. 6 provides a longer optical path, thus allowing folding thereof to result in compact displays. In conventional loupes or viewers used with transmissive and/or emissive displays, the pupil of the eye at location 270 serves as the aperture stop of the lens. In the inventive optical system, since the aperture stop or mirror 110 (FIG. 3) resides near the PBS 16 for illumination purposes, it is necessary to make the pupil of the eye conjugate to this aperture stop 110. This forms an intermediate image where the field stop 110 is placed near one of the PBS's sides 115. This additional optical relaying of the image (between the PBS exit surface 210 and the viewer 32), together with the pupil of the eye, results in a longer optical system providing much needed foldability and compactness in head mounted display (HMD) applications.

An additional advantage of the embodiment shown in FIG. 6 is compatibility with folding optics. Foldability is desired to produce a compact complete system for miniature personal displays, such as head mounted displays.

Figure 7:
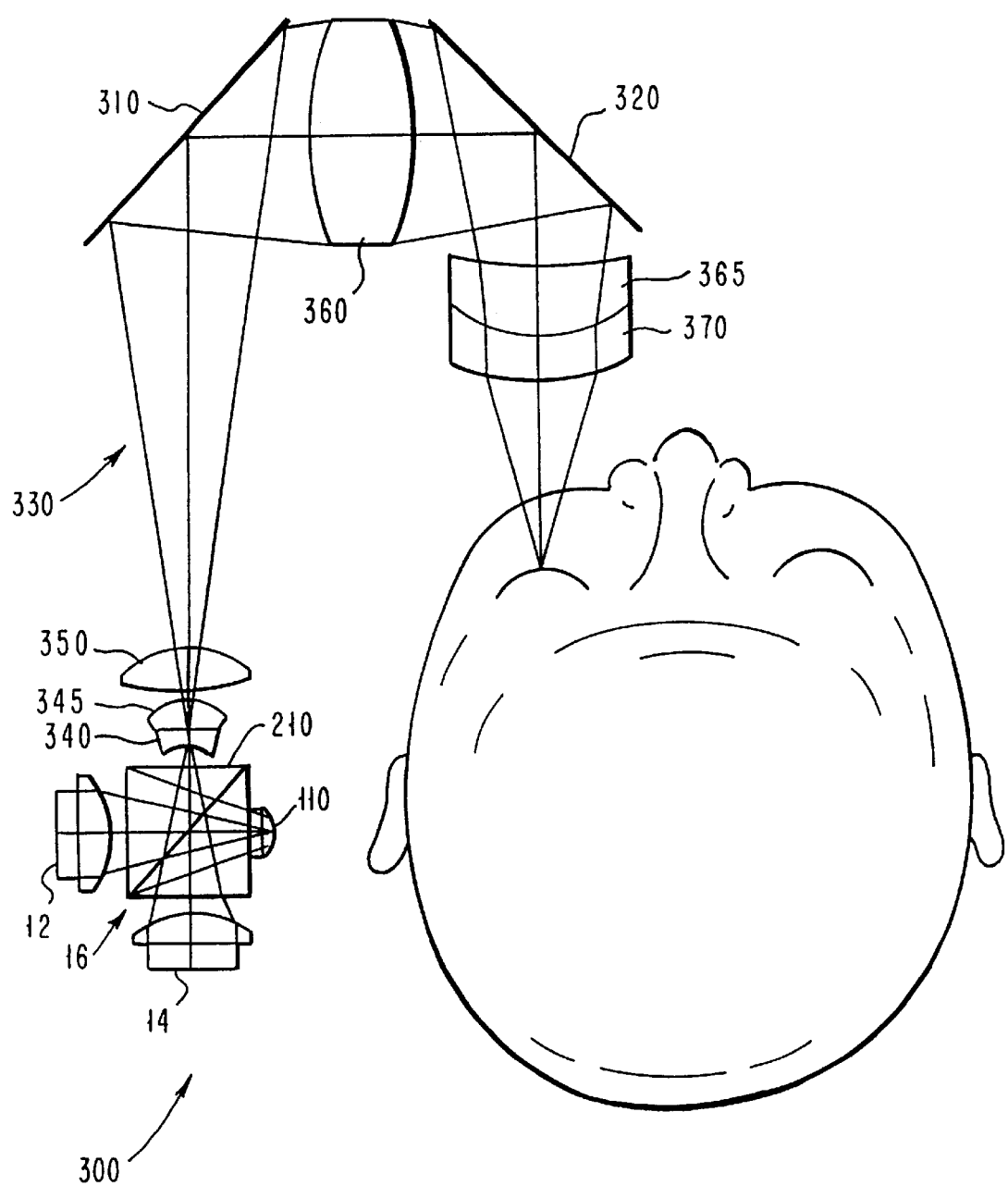
FIG. 7 shows an optical system using reflective light valves according to a further embodiment of the present invention.

FIG. 7 shows an optical system 300 which is similar to the optical system 250 of FIG. 6, except the optical system 300 has two folds incorporated in the optical path between the exit face 210 of the PBS 16 and the viewer 32. Two folding mirrors 310, 320 are positioned at convenient locations to produce a compact head mounted display. FIG. 7 also shows a schematic representation of a human head viewed from the top and the orientation of the fold system.

As shown in FIG. 7, an imaging system 330 comprises six elements 340, 345, 350, 360, 365, 370 in three groups. The first, second and third elements 340, 345, 350 form the first group; the fourth element 360 forms the second group; and the fifth and sixth elements 365, 370 form the third group.

While the invention has been particularly shown and described with respect to illustrative and preformed embodiments thereof, it will be understood by those skilled in the art that the foregoing and other changes' in form and details may be made therein without departing from the spirit and scope of the invention which should be linked only by the scope of the appended claims.

Having thus described our invention, what we claim as new, and desire to secure by Letters Patent is:

1. A display for projecting an image comprising:

a backlight source for providing a light beam; a polarizing beam splitter having a first surface that receives the light beam from the backlight source, said polarizing beam splitter passing a first polarization and reflecting a second polarization of the received light beam;

a reflector that receives said first polarization of light from said polarizing beam splitter and reflects it back to the polarizing beam splitter;

a quarter wave plate disposed between said polarizing beam splitter and said reflector, said quarter wave plate changing said first polarization of light beam from said polarizing beam splitter to said second polarization of light beam received by said polarizing beam splitter from said reflector;

a spatial light modulator that receives from said polarizing beam splitter said second polarization of light beam received by said polarizing beam splitter from said reflector, said spatial light modulator selectively rotating said received second polarization of light beam to form an image forming light beam of said first polarization, and reflecting said image forming light beam toward a viewer through said polarizing beam splitter;

wherein the backlight source is located on a first side of the polarizing beam splitter, and the reflector and the quarter wave plate are located on a second, opposite side of the polarizing beam splitter;

wherein the light beam passes twice through the polarizing beam splitter between the light source and the spatial light modulator, a first pass through occurring as the light beam passes from the light source to the reflector, and a second pass through occurring as the light beam passes from the reflector to the spatial light modulator; and wherein said reflector is an aperture stop that determines a numerical aperture of the illumination system, and said reflector reflects light within said numerical aperture back to said polarizing beam splitter, and reflects light falling outside said numerical aperture to a light absorbing substrate.

* * * * *